(12) United States Patent
Messerges et al.

(10) Patent No.: US 8,320,350 B2
(45) Date of Patent: Nov. 27, 2012

(54) METHOD, SYSTEM AND A DATA FRAME FOR COMMUNICATION IN A WIRELESS COMMUNICATION SYSTEM

(75) Inventors: Thomas S. Messerges, Schaumburg, IL (US); Gregory J. Buchwald, Crystal Lake, IL (US); Stephen L. Kuffner, Algonquin, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 1358 days.

(21) Appl. No.: 11/861,358

(22) Filed: Sep. 26, 2007

(65) Prior Publication Data

US 2009/0080389 A1 Mar. 26, 2009

(51) Int. Cl.
*H04W 4/00* (2009.01)
(52) U.S. Cl. ........ 370/341; 370/329; 370/338; 370/340; 455/434
(58) Field of Classification Search .................. 370/310, 370/312, 328, 329, 338, 340, 341; 455/403, 455/410, 411, 422.1, 434
See application file for complete search history.

(56) References Cited

U.S. PATENT DOCUMENTS

| | | | | |
|---|---|---|---|---|
| 6,658,004 | B1 * | 12/2003 | Kadansky et al. | 370/394 |
| 7,522,551 | B2 * | 4/2009 | Giaimo et al. | 370/328 |
| 7,596,109 | B1 * | 9/2009 | Farrington | 370/312 |
| 7,664,030 | B2 * | 2/2010 | Sugaya | 370/235 |
| 2004/0246983 | A1 * | 12/2004 | Kaatz | 370/432 |
| 2005/0159134 | A1 * | 7/2005 | Suzuki | 455/410 |
| 2008/0051099 | A1 * | 2/2008 | Moore et al. | 455/454 |
| 2008/0175197 | A1 * | 7/2008 | Shao et al. | 370/329 |
| 2009/0010438 | A1 * | 1/2009 | Gilb | 380/277 |

OTHER PUBLICATIONS

R. Chen et al, "Ensuring Trustworthy Spectrum Sensing in Cognitive Radio Networks", IEEE Workshop on Networkaing Technologies for Software Defined Radio Networks—Sep. 2006—10pp.
Pintsov, L., et al., "Postal Revenue Collection in the Digital Age," Financial Cryptography, 2000.

* cited by examiner

*Primary Examiner* — Chi Pham
*Assistant Examiner* — Weibin Huang
(74) *Attorney, Agent, or Firm* — Barbara R. Doutre (57) ABSTRACT

A means for determining a channel for communication in a wireless communication system is provided. A method includes receiving one or more sub-frames of a beacon signal on a beaconing channel until a legitimacy condition of the beacon signal is met. The beacon signal is transmitted by a beaconing device. The method further includes determining a suitability of the channel for communication in the wireless communication system based on the legitimacy condition.

23 Claims, 3 Drawing Sheets

METHOD, SYSTEM AND A DATA FRAME FOR COMMUNICATION IN A WIRELESS COMMUNICATION SYSTEM

FIELD OF THE INVENTION

The present invention relates generally to wireless communication systems and more specifically to determining a channel for communication in a wireless communication system.

BACKGROUND OF THE INVENTION

With the growth of wireless communication in recent times, frequency sharing and frequency reuse techniques are being encouraged worldwide by regulatory institutions, such as the Federal Communications Commission (FCC) in the United States of America. As an example, the FCC has mandated that in 2009 the broadcast of television (TV) signals shall change from analog to digital. When this occurs, the FCC has proposed that license-exempt devices can operate on unused portions of the newly unoccupied spectrum. A radio frequency management method known as opportunistic sharing is being considered for this spectrum. Specifically, the FCC has proposed to allow license-exempt communication devices to operate within portions of the television (TV) white space not used for broadcasts. Although this portion is not used for broadcasts, some low-power, licensed communication devices such as wireless microphones can also use this spectrum. Consequently, a license-exempt communication device that is unaware of the presence and proximity of the low-power licensed devices may cause interference. Thus, it is important that the licensed communication devices are protected from interference to avoid disruption in services.

One method of protection that can enable continued interference-free operation of the licensed, incumbent services and promote spectrum sharing with the license-exempt communication devices involves the use of beacon signals. Typically, a beaconing device in such a wireless communication network sends beacon signals on a beaconing channel or a beaconing sub-channel. A channel is defined to be a specific radio frequency band. Furthermore, a channel may be divided into sub-channels, where each sub-channel is radio frequency band within the band of the corresponding channel. One or more of these sub-channels may be used by a beaconing device for transmitting beacon signals. For sake of brevity, the term channel used herein may be used interchangeably with the term sub-channel unless explicitly noted otherwise. The beacon signal includes information about the beaconing device, such as the beaconing device's Media Access Control (MAC) address, the location of the beaconing device, the channels or sub-channels that are being used by the beaconing device or by the communication device associated with the beaconing device, the length of time that these channels will be used, the priority of the beaconing device, etc. This information can be used for various purposes such as synchronization, checking signal strength of the beaconing device and determining proximity to the licensed device. A communication device that wants to use a channel, such as a license-exempt communication device, may periodically monitor the RF spectrum to detect the presence or absence of beacon signals. If a beacon signal is heard on a beacon channel or a beacon sub-channel, then the communication device may not be able to use the corresponding channel indicated by the beacon signal for communication. Such a beacon signal is sometimes referred to as a "disabling" beacon signal.

Because a beacon signal serves as an authority to restrict access to a part of the RF spectrum, it is important that a communication device be able to determine the authenticity of a beacon signal. For instance, the beacon signal may be generated by a rogue, unlicensed beaconing device trying to cause a communication device to leave a channel. Motivations for a user operating such a rogue beaconing device may arise from a desire to clear the radio spectrum for use by a communication device, such as by indicating a falsely high priority level in the beacon signal, or a desire to simply cause other communication devices problems, such as by falsely indicating that a certain channel or set of channels is being used, for example, a denial-of-service attack.

To determine the authenticity of the beaconing device, the communication device listens to the entire beacon signal to acquire a signature of the beaconing device and a corresponding certificate granted to the beaconing device. In existing techniques, the communication device has to listen to the entire beacon signal to determine the authenticity of the beaconing device. However, any time spent listening to a beacon signal is wasteful, as communication devices sensing the beaconing channel or beacon sub-channels have to cease their normal operations to allow for a sensing module, which may reside in the communication device, to listen for a beacon signal. Such extended interruptions at the communication device may increase the latency in potentially time-sensitive applications and may also reduce the channel capacity.

Accordingly, it would be desirable to have a means of efficiently selecting a channel for communication in the wireless communication system.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the invention.

DETAILED DESCRIPTION OF THE INVENTION

Before describing in detail embodiments that are in accordance with the present invention, it should be observed that the embodiments reside primarily in combinations of method steps and apparatus components related to determining a channel for communication in a wireless communication system. Accordingly, the apparatus components and method steps have been represented where appropriate by conventional symbols in the drawings, showing only those specific details that are pertinent to understanding the embodiments of the invention so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

In this document, relational terms such as first and second, top and bottom and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art. The term "coupled" as used herein is defined as connected, although not necessarily directly and not necessarily mechanically. A device or structure that is "configured" in a certain way is configured in at least that way, but may also be configured in ways that are not listed.

It will be appreciated that embodiments of the present invention described herein may be comprised of one or more conventional processors and unique stored program instructions that control the one or more processors to implement, in conjunction with certain non-processor circuits, some, most, or all of the functions for determining a channel for communication in a wireless communication system described herein. The non-processor circuits may include, but are not limited to, a radio receiver, a radio transmitter, signal drivers, clock circuits, power source circuits and user input devices. As such, these functions may be interpreted as steps of methods for determining a channel for communication in a wireless communication system described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology and economic considerations, when guided by the concepts and principles disclosed herein will be readily capable of generating such software instructions and programs and ICs with minimal experimentation.

Generally speaking, in accordance with various embodiments, the present invention relates to determining a channel for communication in a wireless communication system. A channel is generally defined to be a specific radio frequency band that can be used for communication in the wireless communication system. Furthermore, a channel may be divided into sub-channels, where each sub-channel is a radio frequency band within the band of the corresponding channel. For sake of brevity, the term channel used herein may be used interchangeably with the term sub-channel unless explicitly noted otherwise. Specifically, in accordance with the present invention, a channel is determined for communication based on beacon signals received over a beaconing channel that may, for example, be the same as the channel, a sub-channel of the channel or a separate channel altogether. If the beacon signals are not received for a predetermined time interval, a communication device may use the channel for communication. Further, in accordance with the present invention, a communication device, which wishes to determine whether the channel can be used for communication, may listen to the beaconing channel for one or more sub-frames of a beacon signal, as opposed to the entire beacon signal. The method, system and data frame for determining a channel for communication based on one or more sub-frames of the beacon signal are described in detail herein.

Figure 1:
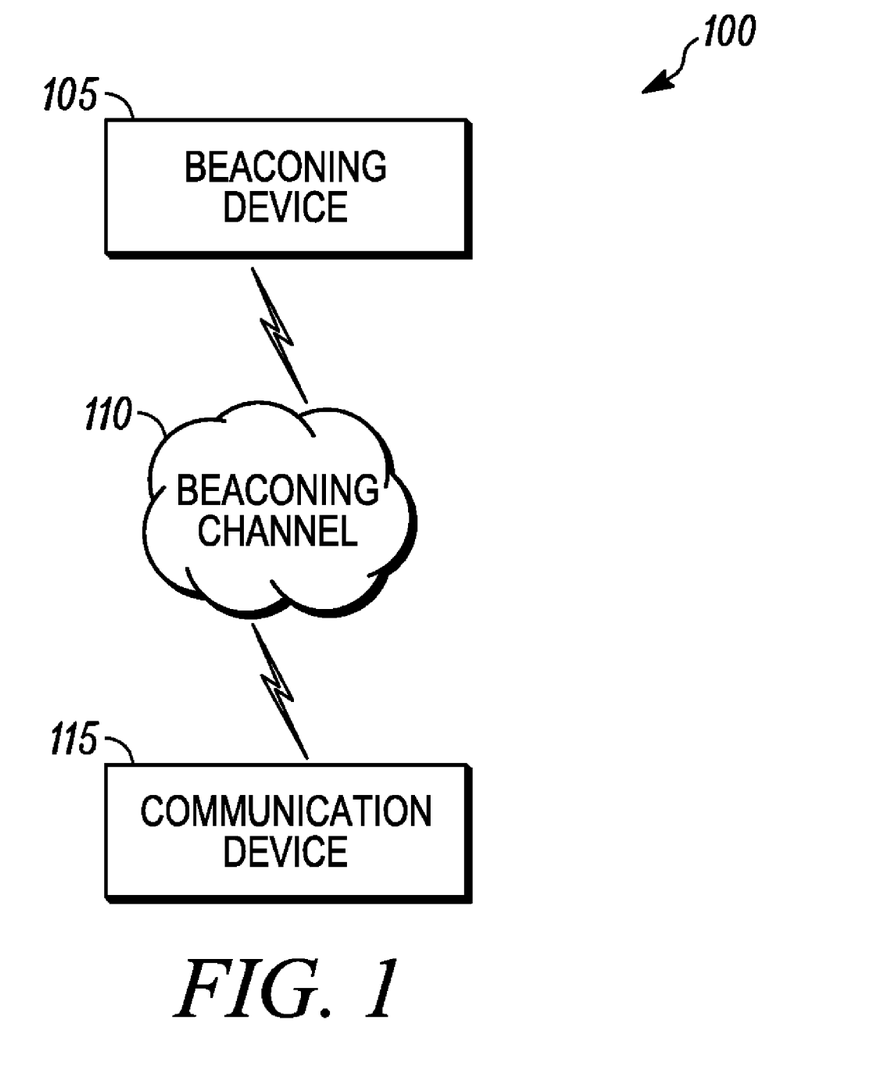
FIG. 1 illustrates an exemplary representation of a wireless communication system in accordance with various embodiments of the present invention.

Referring now to the drawings and in particular to FIG. 1, an exemplary representation of a wireless communication system 100 is shown, in accordance with an embodiment of the present invention. The wireless communication system 100 can be for example, but not limited to Television broadcasting system, Radio broadcasting system, Mobile telecommunication system, Public Safety Communication system, etc. The wireless communication system 100 includes a beaconing device 105, a beaconing channel 110 and a communication device 115. Those skilled in the art will appreciate that even though FIG. 1 depicts one beaconing device, one communication device and one beaconing channel, any number of beaconing devices, beaconing channels and communication devices may be present in the wireless communication system 100 and all such embodiments are within the scope of the present invention.

In one embodiment, the beaconing device 105 may be a stand alone device associated with one or more communication devices. In another embodiment, the beaconing device 105 may reside on a communication device. The communication device that is associated with the beaconing device 105 may be using a channel for communication in the wireless communication system 100. In other embodiment, to prevent other communication devices from using the channel used by the communication device that is associated with the beaconing device 105, the beaconing device 105 may send one or more sub-frames of a beacon signal over the beaconing channel 110. Further, the beaconing channel 110 can be reserved for transmitting beacon signals in the wireless communication system 100. Alternatively, the beaconing channel 110 may be used for transmitting beacon signals as well as for communication. For instance, a sub-channel of the beaconing channel 110 may be used for sending beacon signals and another sub-channel of the beaconing channel 110 may be used for communication.

The communication device associated with beaconing device 105 and the communication device 115 may be devices such as, but not limited to, a wireless microphone, a mobile device such as a mobile phone, public-safety radio, or other wireless equipment operating using, for instance, WiFi, WiMax, IEEE 802.22 standards, etc. Further, the beaconing channel 110 may belong to a radio spectrum that can be divided into any number of discrete channels and/or sub-channels depending on the communication needs, such as a TV channel, a radio channel, etc.

Further, a communication device may be using a channel for communication in the wireless communication system 100 and therefore, may gain the assistance of the beaconing device 105 to send beacon signals over the beaconing channel 110. Such a communication device is said to be "associated" with beaconing device 105. The beaconing channel 110 may be a sub-channel of the channel used by this associated communication device. For instance, if the communication device is a wireless microphone using an unoccupied TV channel, then the beaconing device 105 associated with the communication device may transmit beacon signals over the beaconing channel 110 (which may be a sub-channel of the unoccupied TV channel) indicating that this TV channel is being used, so as to disallow other lower priority devices from using that TV channel for communication. As mentioned earlier, it should be noted that the beaconing device 105 and the communication device associated with the beaconing device 105 may be embodied as either separate physical devices or as functions included within the same physical device, such as part of a single chassis, contained within a single circuit board, or part of a single integrated circuit.

Further, the communication device 115 is a device which is capable of identifying one or more channels suitable for communication in the wireless communication system 100. The communication device 115 uses the results of its sensing activities to decide which channels can be used for communication. Those skilled in the art shall appreciate that the communication device 115 may be a licensed device or unlicensed device. Also, the communication device 115 may consist of a sensing module, which is used for sensing beacon signals, and a communication module, that is used for communications. The sensing module and the communication module may be embodied as either separate physical devices or as functions included within the same physical device, such as part of a single chassis, contained within a single circuit board, or part of a single integrated circuit. As an example, the communication device 115 may include a sensing module incorporated within a communication module such as a high-priority Transceiver (Walkie-Talkie), a low-priority transceiver, etc. A high-priority Transceiver may be used by Police, Coast Guard, Fire Brigade and Emergency Medical Services. A low-priority transceiver may be used for non-critical applications such as Family Radio Service (FRS), broadband communications to a home such as Internet services, etc.

The communication device 115 may receive one or more sub-frames of a beacon signal over the beaconing channel 110 until a legitimacy condition is met. The legitimacy condition is explained in conjunction with FIG. 4 herein. In one embodiment, based on the one or more sub-frames, the communication device 115 may identify the channels that are suitable for use in the wireless communication system 100 and may then communicate in the wireless communication system 100 using one of the suitable channels. In an embodiment, the beaconing channel 110 may be a sub-channel of a channel used by the beaconing device 105 for communication. In this case, the communication device 115 may determine that the channel is unsuitable for use in the wireless communication system 100. The communication device 115 may then sense another beaconing channel in the wireless communication system 100 in order to identify channels suitable for communication.

In accordance with an embodiment of the present invention, the beaconing device 105 transmits a beacon signal with a predetermined data frame structure. The beacon signal includes a plurality of sub-frames. The communication device 115, in accordance with the embodiment, receives one or more sub-frames of the beacon signal. The communication device 115 can determine if a channel or a sub-channel can be used for communication, based on the legitimacy condition.

Figure 2:
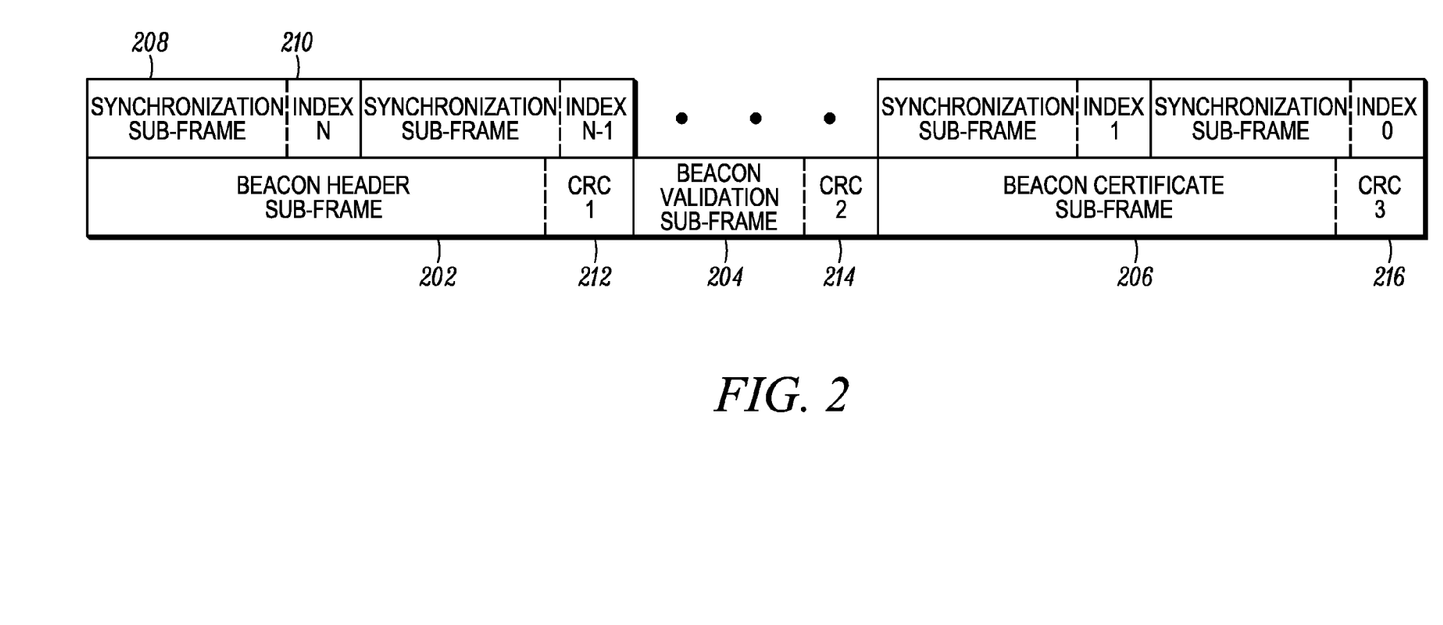
FIG. 2 illustrates a block diagram of a data frame for a beacon signal in a wireless communication system in accordance with an embodiment of the present invention.

Refer now to FIG. 2, a block diagram of a data frame for a beacon signal in a wireless communication system is shown, in accordance with an embodiment of the present invention. The data frame of the beacon signal includes a plurality of sub-frames. The plurality of sub-frames includes a beacon header sub-frame 202, a beacon validation sub-frame 204 and a beacon certificate sub-frame 206.

The beacon header sub-frame 202 may include one or more of a Media Access Control (MAC) address of the beaconing device 105 or of a communication device associated with the beaconing device 105, information corresponding to the physical location of the beaconing device 105 or of the communication device associated with the beaconing device 105, information corresponding to channels or sub-channels being used for communication by the communication device associated with the beaconing device 105 and information corresponding to the estimated duration of channel or sub-channel occupancy by the communication device associated with the beaconing device 105.

Further, the beacon validation sub-frame 204 may include a beacon signature created by the beaconing device 105 that is over portions of the data frame or sub-frames thereof. The communication device 115 may use the beacon signature to ascertain the legitimacy of a beacon signal, thereby helping thwart fraudulent usage of the channels or sub-channels of the wireless communication system 100. The beacon validation sub-frame 204 may be created using known art such as a symmetric-key protection technique, for example a symmetric-key message authentication code (MAC), or an asymmetric-key protection technique, for example a public-key signature.

Further, the beacon certificate sub-frame 206 includes a public-key certificate of the beaconing device 105. The public-key certificate includes information which may be used by the communication device 115 to ascertain a legitimate public-key attributed to the beaconing device 105. This public key may be used for a cryptographic authentication check of the beacon signature created by the beaconing device 105. In an embodiment of the present invention, the public key attributed to the beaconing device 105 may be stored in a database accessible from, for instance, a website. In this embodiment, the beacon certificate sub-frame 206 may not be included in data frame of the beacon signal.

Further, in an embodiment of the present invention, the data frame may include one or more synchronization sub-frames. The exemplary data frame of FIG. 2 includes a plurality of synchronization sub-frames. One such synchronization sub-frame is depicted as a synchronization sub-frame 208. It will be apparent to a person skilled in the art that there may be any number of synchronization sub-frames in the data frame. Further, as depicted, the synchronization sub-frame 208 may be transmitted parallel to the beacon header sub-frame of the beacon signal on an orthogonal channel. Also, it will be appreciated that a plurality of synchronization sub-frames can be transmitted parallel to the one or more sub-frames of the beacon signal.

The synchronization sub-frame 208 includes information used for synchronizing with the beaconing device 105. For this purpose, the synchronization sub-frame 208 may include an index 210. The index 210 is a countdown to the start of the next data frame of the beacon signal. Thus, the index 210 may, for instance, be used by the communication device 115 to identify time to start sensing for the next data frame or to determine the time left for receiving a particular data frame.

Further, in an embodiment of the present invention, one or more sub-frames of the plurality of sub-frames include or are covered by an error-checking code and/or an error-correcting code. An example of the error-checking code and/or error-correcting code is, but is not limited to, a convolution code. An error may be induced in a sub-frame during transmission of the sub-frame from the beaconing device 105 to the communication device 115. Such errors in the sub-frames may be identified using the error-checking code and/or corrected using the error-correcting code. The error-checking codes may include a Cyclic Redundancy Check (CRC). In the exemplary data frame of FIG. 2, the beacon header sub-frame 202 includes a CRC-1 212. The CRC-1 212 may be used for checking an error in the beacon header sub-frame 202. Similarly, the beacon validation sub-frame 204 includes a CRC-2 214 and the beacon certificate sub-frame 206 includes a CRC-3 216. Each of the CRC-2 214 and CRC-3 216 may be used for checking errors in the beacon validation sub-frame 204 and the beacon certificate sub-frame 206, respectively.

In another embodiment of the present invention, the data frame may include a combined error-checking and/or error-correcting code for two or more of the beacon header sub-frame 202, the beacon validation sub-frame 204 and the beacon certificate sub-frame 206. For instance, a combined CRC may be appended after the beacon certificate sub-frame 206. This combined CRC can enable error checking and in some embodiments, error correction of the beacon header sub-frame 202, the beacon validation sub-frame 204 and the beacon certificate sub-frame 206. Those skilled in the art will appreciate that the one or more sub-frames may include or be covered by any error-checking code and error-correcting code known in the art.

Further, in one embodiment, a sub-frame and a corresponding CRC are encrypted together. In this embodiment, a receiver receiving the sub-frame may have to decrypt the sub-frame and the corresponding CRC. In another embodiment, the sub-frame is encrypted independently and the corresponding CRC is "in the clear", that is not encrypted. In this embodiment, the receiver may first perform the CRC and may decrypt the sub-frame only if the CRC implies successful reception of the encrypted sub-frame.

Figure 3:
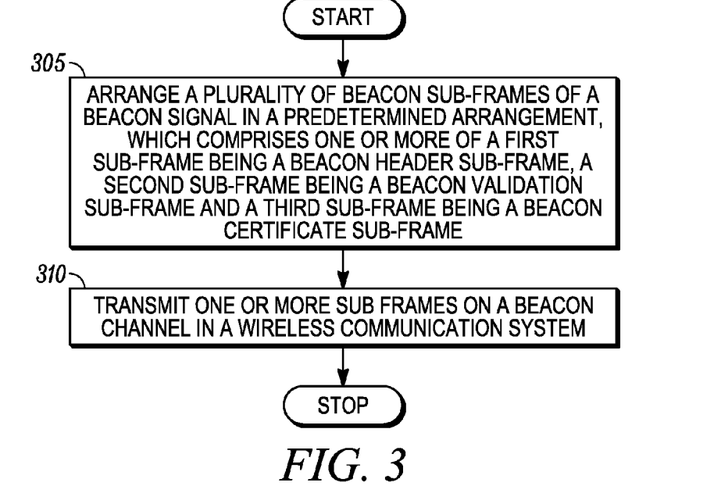
FIG. 3 illustrates a flow diagram of a method for structuring a beacon signal in a wireless communication system in accordance with an embodiment of the present invention.

Turning now to FIG. 3, a flow diagram of a method for structuring a beacon signal in a wireless communication system is shown, in accordance with an embodiment of the present invention. At step 305, the beaconing device 105 arranges a plurality of sub-frames of a beacon signal in a predetermined arrangement. The data frame of the beacon signal is explained in detail in conjunction with FIG. 2 above.

The predetermined arrangement includes one or more of a first sub-frame, a second sub-frame and a third sub-frame. The first sub-frame may be the beacon header sub-frame 202, the second sub-frame may be the beacon validation sub-frame 204 and the third sub-frame may be the beacon certificate sub-frame 206. Each of the beacon header sub-frame 202, the beacon validation sub-frame 204 and the beacon certificate sub-frame 206 are explained in conjunction with FIG. 2.

As mentioned earlier the beacon certificate sub-frame 206 includes a public-key certificate that includes information that can be used to ascertain a public key corresponding to the beaconing device 105. Thereafter, this public key can be used for validating a beacon signature in the beacon validation sub-frame 204. However, in an embodiment of the present invention, the public key used to authenticate a beacon signature may be stored in a database accessible through, for instance, a website. In the embodiment, the beacon certificate sub-frame 206 may not be included in the beacon signal. The beacon certificate sub-frame 206 is explained in conjunction with FIG. 2.

In an embodiment of the present invention, one or more of the plurality of sub-frames may include or be covered by one or more of an error-checking code and an error-correcting code. As explained earlier, the error-checking code may be used for checking errors in one or more sub-frames of the beacon signal and the error-correcting code may be used for correcting the one or more sub-frames of the beacon signal. In an embodiment of the present invention, the error-correcting code may be a convolutional code.

Further, after arranging the plurality of sub-frames, the beaconing device 105 transmits one or more sub-frames of the plurality of sub-frames using the beaconing channel 110 in the wireless communication system 100, at step 310.

Figure 4:
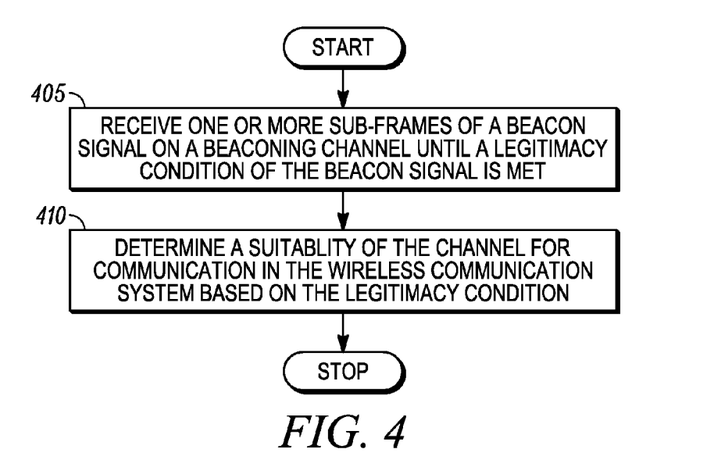
FIG. 4 illustrates a flow diagram of a method for determining a channel for communication in a wireless communication system in accordance with an embodiment of the present invention.

Turning now to FIG. 4, a flow diagram of a method for determining a channel for communication in the wireless communication system 100 is shown, in accordance with an embodiment of the present invention. A beacon signal with data frame of FIG. 2 may be transmitted by the beaconing device 105 over the beaconing channel 110. As mentioned in conjunction with FIG. 2, the data frame of the beacon signal comprises a plurality of sub-frames. At step 405, a one or more sub-frames of the beacon signal is received at the communication device 115 over the beaconing channel 110 until a legitimacy condition is met. The legitimacy condition is explained herein. Further, as explained in conjunction with FIG. 1, the beaconing channel 110 can be a channel or a sub-channel in the wireless communication system 100 of FIG. 1. The one or more sub-frames may include one or more of the synchronization sub-frame 208, the beacon header sub-frame 202, the beacon validation sub-frame 204, and the beacon certificate sub-frame 206. Each of the beacon header sub-frame 202, the beacon validation sub-frame 204, the beacon certificate sub-frame 206, and the synchronization sub-frame 208 are explained in conjunction with FIG. 2 above.

In an embodiment of the present invention, if the one or more sub-frames include one or more of the beacon header sub-frame 202, the beacon validation sub-frame 204 or the beacon certificate sub-frame 206, the one or more sub-frames may include or be covered by an error-checking code or an error-correcting code. For instance, the beacon header sub-frame 202 includes a CRC-1 212 for checking errors in the beacon header sub-frame 202. As explained earlier, the error-checking code may be used for checking errors in the one or more sub-frame and the error-correcting code may be used for correcting the errors. In an embodiment of the present invention, the one or more sub-frames received at 405 may include or be covered by a combined error-checking code or a combined error-correcting code. The combined error-checking code may be used for checking errors in each of the one or more sub-frames. Similarly, the combined error-correcting code may be used for correcting errors in each of the one or more sub-frames. This is explained in conjunction with FIG. 2 in detail.

Further, if the error-checking code is "in the clear", or not encrypted, then the communication device 115 may first perform the error check and may decode the data of the one or more sub-frames only if the error check implies successful reception of the one or more sub-frames. This enables reduction in power consumption when one or more of the sub-frames received at step 405 are received in error.

Next, the communication device 115 determines a suitability of the channel for communication in the wireless communication system 100 based on the legitimacy condition, at step 410. The communication device 115 may, for instance, determine if the channel is suitable for communication, unsuitable for communication or more information is required to determine the suitability of the channel.

In one embodiment, the channel for communication may include the beaconing channel 110. For instance, the beaconing channel 110 may be a sub-channel of the channel for communication. In another embodiment, each of the beaconing channel 110 and the channel for communication may belong to the RF spectrum of the wireless communication system 100. Further, in an embodiment, the beaconing channel 110 may be associated with the channel for communication.

Further, in an embodiment, the beaconing channel 110 may be used for both transmitting beacon signals by the beaconing device 105 and for communication by a communication device associated with the beaconing device 105. For instance, a sub-channel of the channel for communication may be used for sending beacon signals and another sub-channel of the channel for communication may be used for communication.

In another embodiment of the present invention, a common beaconing channel may be reserved for each beaconing device in the wireless communication system 100. Also, in an embodiment of the present invention, a beaconing device may send a beacon signal corresponding to another beaconing device in the wireless communication system 100 on a beaconing channel. This may lead to bandwidth saving in the wireless communication system 100. For example, in the wireless communication system 100, a secondary beaconing device may request the beaconing device 105 to send beacon signals on its behalf.

Referring back to step 405, the legitimacy condition is based on determination of one or more of, but not limited to, a priority indicated in the beacon signal, a signal strength of the beacon signal, a cryptographic authentication check of the beacon signal, and a validity check of a predetermined information in the beacon header sub-frame 202. The predetermined information can include one or more of, but is not limited to, a MAC address of the beaconing device 105, an occupied channel in the wireless communication system 100, an occupied sub-channel in the wireless communication system 100, a location of the beaconing device 105, a location of a communication device associated with the beaconing device 105, an estimated duration of a sub-channel's occupancy time and an estimated duration of a channel occupancy time.

The communication device 115 may choose the channel for communication based on the legitimacy condition. For example, the communication device 115 may receive a sub-frame of the beacon signal that indicates that indicates a low signal strength on the beaconing channel 110. In this case, the communication device 115 may construe the one or more sub-frames as un-decodable or not present and may continue using the channel associated with the beaconing device 105 in wireless communication system 100 or determine that the channel associated with the beaconing device 105 in wireless communication system 100 can be used for communication in the future. Moreover, the communication device 115 may continue using the channel for communication or classify the channel for use if the one or more sub-frames indicate a priority in the beacon signal to be low, for instance, the beacon signal transmitted by a beaconing device associated with a low-priority transceiver such as a Family Radio System (FRS). Further, the one or more sub-frames may indicate that the beaconing device 105 is an illegitimate device, such as a beaconing device that has been blacklisted by an authority trusted to manage licensed devices. In this case, the communication device 115 may determine the channel associated with the beaconing channel 110 to be suitable for communication in the wireless communication device. The communication device 115 may, then, choose to remain on the channel for communication, if the interference caused by the beacon signals is tolerable, that is, the signal strength of the beacon signal is less than a predetermined signal strength.

Further, if the one or more sub-frames received at step 305 include the beacon header sub-frame 202, the legitimacy condition may be based on a validity check of the predetermined information in the beacon signal. For example, it may be determined that the beacon signal is an illegitimate beacon signal if a MAC address of the beaconing device 105 is invalid, a location of the beaconing device 105 is invalid, channels or sub-channels indicated as being occupied are invalid, an estimated duration of channel or sub-channel occupancy time is more than a predetermined threshold occupancy time, or a location of the communication device associated with the beaconing device 105 is invalid.

The MAC address may be deemed invalid if, for instance, the MAC address has a history of producing invalid beacon signals. The location of the beaconing device 105 or the communication device associated with the beaconing device 105 may be deemed invalid if, for instance, there is a mismatch between the signal strength of the beacon signal and the location indicated in the beacon header sub-frame 202. Thereafter, if the communication device 115 determines that the beaconing device 105 is a rogue device, the communication device 115 may further determine that an adversary may be trying to jam the wireless communication system 100 and may report to a central authority about the adversary.

On the other hand, if the communication device 115 determines that the beaconing device 105 is a legitimate device, the communication device 115 may check if a priority indicated in the beacon signal is higher than a predetermined priority level. If the beacon signal is higher than the predetermined priority level, the communication device 115 may determine the channel to be unsuitable for communication. The communication device 115 may then listen to another beaconing channel in the wireless communication system 100. On the contrary, if the beacon signal is lower than the predetermined priority level, the communication device 115 may determine the channel to be suitable for communication. Consequently, the communication device 115 may choose the current channel associated with the beaconing channel 110, if the interference caused by the beacon signal is tolerable.

Further, if the one or more sub-frames received at step 405 include the beacon validation sub-frame 204, the legitimacy condition may be based on a cryptographic authentication check. The cryptographic authentication check may be based on a standard public-key signature verification technique. It will be apparent to a person skilled in art that the standard public-key signature verification technique may include verifying the legitimacy of a public-key certificate extracted by the communication device 115 from a received beacon certificate sub-frame 206.

In an embodiment of the present invention, for the cryptographic authentication check, the communication device 115 seeks a public-key for verifying a beacon signature created by the beaconing device 105. The beacon signature may be obtained from the beacon validation sub-frame 204. Further, in an embodiment, the communication device 115 may retrieve the public key or verify whether the public key is attributed to the beaconing device 105 by consulting a database accessible through, for instance, a website. The database may include a public key for each registered beaconing device in the wireless communication system 100. In an embodiment of the present invention, the database may be stored in the communication device 115 and communication device 115 may periodically query a server to securely download updates to this database. Alternatively, the database may be stored on a server and the communication device 115 may communicate with the server in a secure manner, for instance, to ensure the integrity and authenticity of the data purportedly received from the database.

In an alternate embodiment, for obtaining the public-key, the communication device 115 may listen to the beaconing channel 110 to receive the beacon certificate sub-frame 206. The communication device 115 obtains a public-key certificate from the beacon certificate sub-frame 206. Thereafter, the public-key may be obtained from the public-key certificate which is then used for performing the cryptographic authentication check.

Further, in an embodiment, the communication device 115, based on the one or more sub-frames and the legitimacy condition, may classify the channel associated with the beaconing channel 110 in one of a suitable channel category and an unsuitable channel category. The suitable channel category includes one or more channels in the wireless communication system 100, which are determined suitable for communication by the communication device 115, The communication device 115 classifies the channel for communication in the suitable channel category if one or more of a priority indicated in the beacon signal is below a predetermined level, a signal strength of the beacon signal is below a predetermined level, a cryptographic authentication check of the beacon signal indicates that the beacon signal is illegitimate, and a validity check of a predetermined information in the beacon header sub-frame 202 indicates that the beacon signal is invalid. The predetermined information is explained in detail above.

Alternatively, the communication device 115 may classify the channel associated with the beaconing channel 110 in the unsuitable channel category if one or more of a priority indicated in the beacon signal is above a predetermined level, a signal strength of the beacon signal is above a predetermined level, a cryptographic authentication check of the beacon signal indicates that the beacon signal is legitimate, and a validity check of the predetermined information in the beacon header sub-frame 202 indicates that the beacon signal is valid.

In an embodiment of the present invention, the communication device 115 may classify the channel for communication in the unsuitable channel category, as soon as the communication device 115 receives a first sub-frame of the beacon signal. The communication device 115 may not authenticate the beacon signal transmitted by the beaconing device 105 using the validity check of the predetermined information and the cryptographic authentication check in this embodiment. Thus, if the first sub-frame is the synchronization sub-frame 208, the communication device 115 may spend, for example, only about 5 ms to sense the beaconing channel 110 and then the communication device 115 may determine the channel associated with the beaconing channel 110 as being occupied. Consequently, the communication device 115 may classify the channel in the unsuitable channel category in as little as 5 ms. This enables the communication device 115 to spend less time than usual to listen to the beacon signal and consequently, may reduce latency or increase throughput at the communication device 115. Also, the communication device 115 can spend less time waiting to detect a long beacon and it can continue with its normal communications sooner than without the present invention.

In another embodiment, the communication device 115 may check if the beacon signal is a predetermined high-priority signal based on the information in the beacon header sub-frame 202. For instance, if a sub-frame received at the communication device 115 corresponds to a transceiver used by Police or an incumbent service, the communication device 115 may determine that the beacon signal is high-priority signal. Alternatively, a sub-frame may explicitly indicate a priority level, represented by, for instance, an integer value, that is higher than a predetermined value, thus making it a high-priority signal. Consequently, the communication device 115 may switch to another channel in the wireless communication system 100, so as not to cause any disruption in the ongoing communication over the channel.

Further, the communication device 115 may use any of the channels classified in the suitable channel category for communication in the wireless communication system.

Figure 5:
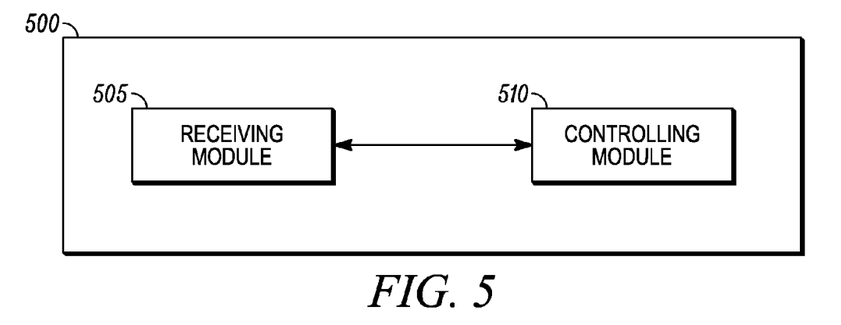
FIG. 5 illustrates a block diagram of a system for determining a channel for communication in a wireless communication system in accordance with an embodiment of the present invention.

Turning now to FIG. 5, a block diagram of a system 500 for determining a channel for communication in the wireless communication system 100 is shown, in accordance with an embodiment of the present invention. As an example, the system 500 might be a sensing module in the communication device 115. The sensing module may help the communication device 115 to determine a channel for communication that may be used by the communication device 115.

The system 500 includes a receiving module 505 and a controlling module 510. The receiving module 505 receives one or more sub-frames of a beacon signal of the beaconing device 105 over the beaconing channel 110 in wireless communication system 100 until a legitimacy condition is met. The legitimacy condition is explained in detail in conjunction with FIG. 4. The one or more sub-frames received at the communication device 115 may be the synchronization sub-frame 208, the beacon header sub-frame 202, the beacon validation sub-frame 204, or the beacon certificate sub-frame 206. Each of the beacon header sub-frame 202, the beacon validation sub-frame 204, the beacon certificate sub-frame 206 and the synchronization sub-frame 208 are explained in conjunction with FIG. 2 above. In an embodiment of the present invention, the receiving module 505 may also receive an error-checking code or an error-correcting code which may be included in the one or more sub-frames, if the one or more sub-frames include one of the beacon header sub-frame 202, the beacon validation sub-frame 204 and the beacon certificate sub-frame 206.

After the receiving module 505 receives the first sub-frame, the controlling module 510 detects a legitimacy condition of the beacon signal on the beaconing channel 110. As explained in conjunction with FIG. 4 the legitimacy condition is based on determination of one or more of, but not limited to, a priority indicated in a beacon signal, a signal strength of the beacon signal, a cryptographic authentication check of the beacon signal, and a validity check of a predetermined information in the beacon header sub-frame 202. The predetermined information is explained in conjunction with FIG. 4.

The controlling module 510 may perform a validity check for the predetermined information in the beacon signal to determine whether the beacon signal is an illegitimate beacon signal. In an embodiment, the controlling module 510 may determine that the beacon header sub-frame 202 is illegitimate, if a MAC address of the beaconing device 105 is invalid, a location of the beaconing device 105 is invalid or an estimated duration of channel occupancy is more than a predetermined threshold occupancy time.

The MAC address may be deemed invalid if, for instance, the MAC address is one that has a history of producing invalid beacon signals. The location of the beaconing device 105 may be deemed invalid if, for instance, there is a mismatch between the signal strength of the beacon signal and the location indicated in the beacon header sub-frame 202. Thereafter, if the controlling module 510 determines that the beaconing device 105 is a rogue device, the controlling module 510 may further determine that an adversary may be trying to jam the wireless communication system 100 and may report to a central authority about the adversary. On the other hand, if the controlling module 510 determines that the beaconing device 105 is a legitimate device, the controlling module 510 may determine the priority of the beacon signal. Thereafter, the controlling module 510 may check if the beacon signal is higher than the predetermined low-priority signal. If the beacon signal is higher than the predetermined low-priority signal, then the controlling module 510 may either switch to another channel in the wireless communication system 100 or may want to acquire the next sub-frame of the beacon signal. On the contrary, if the beacon signal is lower than the predetermined low-priority signal, then the controlling module 510 may choose to continue communication over the channel associated with the beaconing channel 110, if the interference caused by the beacon signal is tolerable.

Further, the controlling module 510 notifies the receiving module 505 if the legitimacy condition is met. Consequently, the receiving module 505 may keep receiving the sub-frames of the beacon signal on the beaconing channel 110, until the controlling module 510 notifies the receiving module 505 about the legitimacy condition being met. In this manner, the controlling module 510 may determine a suitability of the channel for communication in the wireless communication system 100 based on the legitimacy condition.

In an embodiment of the present invention, the controlling module 510 is further configured to classify the channel in one of a suitable channel category and an unsuitable channel category. As mentioned earlier, the suitable channel category includes one or more channels that may be used for communication by the communication device 115.

The controlling module 510 classifies the channel in the suitable channel category if one or more of a priority indicated in the beacon signal is below a predetermined level, a signal strength of the beacon signal is below a predetermined level, a cryptographic authentication check of the beacon signal indicates that the beacon signal is illegitimate, and a validity check of a predetermined information in the beacon header sub-frame indicates that the beacon signal is invalid. The predetermined information is explained in detail above.

Alternatively, the controlling module 510 may classify the channel in the unsuitable channel category if one or more of a priority indicated in the beacon signal is above a predetermined level, a signal strength of the beacon signal is above a predetermined level, a cryptographic authentication check of the beacon signal indicates that the beacon signal is legitimate, and a validity check of the predetermined information in the beacon header sub-frame indicates that the beacon signal is valid.

In an embodiment of the present invention, the controlling module 510 may classify the channel for communication in the unsuitable channel category, as soon as the receiving module 505 receives a first sub-frame of the beacon signal. The controlling module 510 may choose not to authenticate the beacon signal transmitted by the beaconing device 105 using the validity check of the predetermined information or the cryptographic authentication check in this embodiment. Thus, if the first sub-frame is the synchronization sub-frame 208, the controlling module 510 may spend, for example, only about 5 ms to sense the beaconing channel 110 and then controlling module 510 can classify the channel in the unsuitable channel category. This enables the controlling module 510 to spend less time than usual to listen to the beacon signal and consequently, may reduce latency or increase throughput at the communication device 115. Also, the communication device 115 can spend less time waiting to detect a long beacon and it can continue with its normal communications sooner than without the present invention.

In another embodiment, the controlling module 510 may check if the beacon signal is a predetermined high-priority signal based on the information in the beacon header sub-frame 202 which is received by the receiving module 505. For instance, if a sub-frame received at the receiving module 505 corresponds to a transceiver used by Police or an incumbent service, the controlling module 510 may determine that the beacon signal is high-priority signal. Alternatively, a sub-frame may explicitly indicate a priority level, represented by, for instance, an integer value, that is higher than a predetermined value, thus making it a high-priority signal. Consequently, the communication device 115 may switch to another channel in the wireless communication network 100, so as not to cause any disruption in the ongoing communication over the channel.

Further, the communication device 115 may use any of the channels classified in the suitable channel category for communication. The classification of the channel for communication in one of the suitable channel category and the unsuitable channel category is explained in detail in conjunction with FIG. 4.

It will be apparent to a person skilled in art that the system 500 may be integrated into a stand alone device such as the communication device 115, which may be a device such as a wireless transceiver. Alternatively, the system 500 may be a stand alone sensing module coupled to the communication device 115.

The functions performed by the receiving module 505 and the controlling module 510 can be split in various ways across the communication device 115 and a sensing module. For example, in one embodiment the sensing module may be a separate stand alone device not residing on the communication device 115. In this embodiment, the communication device 115 may include the receiving module 505 and the sensing module may include the controlling module 510. In yet another embodiment the communication device 115 and the sensing module may be combined into a single device, in which case all modules in FIG. 5 would be incorporated within this single device.

Various embodiments of the present invention provide methods, system and data frame for determining a channel for communication in a wireless communication system. The methods of the present invention facilitate licensed devices and unlicensed devices to use unused channels in a wireless communication system, such that the unlicensed devices do not disrupt the transmissions from the licensed devices. Further, the data frame of the present invention eliminates the need for a communication device to receive a large size beacon signal. This ensures that the communication device need not cease its normal operations for a long time and that communication devices do not wait a long time for receiving beacon signals. Therefore, efficiency of communication devices is increased and the quality of communication in the wireless communication system is also improved. The methods of the present invention also facilitate efficient authentication of a beaconing device using sub-frames of the beacon signal transmitted by the beaconing device.

In the foregoing specification, specific embodiments of the invention have been described. However, one of ordinary skill in the art appreciates that various modifications and changes can be made without departing from the scope of the invention as set forth in the claims below. Accordingly, the specification and figures are to be regarded in an illustrative rather than a restrictive sense and all such modifications are intended to be included within the scope of the invention. The benefits, advantages, solutions to problems and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method for determining a channel for communication in a wireless communication system, the method comprising:
receiving one or more sub-frames of a beacon signal on a beaconing channel until a legitimacy condition of the beacon signal on the beaconing channel is met, the beacon signal being transmitted by a beaconing device, wherein the one or more sub-frames comprises at least one of an error-checking code and an error-correcting code, each error-checking code being used to check for one or more errors in at least one of the one or more sub-frames, the one or more sub-frames comprising a beacon header sub-frame, a beacon validation sub-frame and a beacon certificate sub-frame, each error-correcting code being used for correcting one or more errors in an individual sub-frame, the individual sub-frame being one of a beacon header sub-frame, a beacon validation sub-frame or a beacon certificate sub-frame; and
determining a suitability of the channel for communication in the wireless communication system based on the legitimacy condition of the beacon signal.

2. The method of claim 1, wherein the one or more sub-frames comprises at least one of a synchronization sub-frame, a beacon header sub-frame, a beacon validation sub-frame and a beacon certificate sub-frame.

3. The method of claim 2, wherein the legitimacy condition is based on determination of at least one of a priority indicated in the beacon signal, a signal strength of the beacon signal, and a validity check of a predetermined information in the beacon header sub-frame.

4. The method of claim 2, wherein the beacon validation sub-frame is created using one of a symmetric-key protection technique or an asymmetric-key protection technique.

5. The method of claim 3, wherein the predetermined information in the beacon header sub-frame comprises at least one of:
a MAC address of the beaconing device;
an occupied channel in the wireless communication system;
an occupied sub-channel in the wireless communication system;
a location of the beaconing device;
a location of a communication device associated with the beaconing device;
an estimated duration of a sub-channel's occupancy time; and
an estimated duration of a channel occupancy time.

6. The method of claim 3, wherein the priority indicated in the beacon signal is based on usage application of the beaconing device.

7. The method of claim 1, further comprises classifying the channel in one of a suitable channel category and an unsuitable channel category based on the legitimacy condition, wherein one or more channels in the suitable channel category is used for communication in the wireless communication system.

8. The method of claim 7, wherein the channel is classified in the suitable channel category when at least one of a priority indicated in the beacon signal is below a predetermined level, a signal strength of the beacon signal is below a predetermined level, and a validity check of a predetermined information in a beacon header sub-frame indicates that the beacon signal is invalid.

9. The method of claim 7, wherein the channel is classified in the unsuitable channel category when at least one of a priority indicated in the beacon signal is above a predetermined level, a signal strength of the beacon signal is above a predetermined level, and a validity check of the predetermined information in the beacon header sub-frame indicates that a beacon signal is valid.

10. The method of claim 1, wherein the one or more sub-frames are received by a receiving module and the suitability of the legitimacy condition is determined by a controlling module, the controlling module notifying the receiving module when the legitimacy condition is met.

11. The method of claim 10, wherein the legitimacy condition is based on determination of at least one of a priority indicated in the beacon signal, a signal strength of the beacon signal, and a validity check of predetermined information in the beacon signal.

12. The method of claim 10, wherein at least one sub-frame of the plurality of sub-frames comprises at least one of an error-checking code and an error-correcting code, the at least one sub-frame being at least one of a beacon header sub-frame, a beacon validation sub-frame and a beacon certificate sub-frame.

13. The method of claim 10, further comprising:
receiving, by the receiving module, an error checking code within an individual sub-frame of the plurality of sub-frames, the receiving module checking and correcting one or more errors in the individual sub-frame, the individual sub-frame being one of a beacon header sub-frame, a beacon validation sub-frame or a beacon certificate sub-frame.

14. The method of claim 10, wherein the one or more sub-frames comprises at least one of a synchronization sub-frame, a beacon header sub-frame, a beacon validation sub-frame and a beacon certificate sub-frame.

15. The method of claim 14, wherein the legitimacy condition is based on determination of at least one of a priority indicated in the beacon signal, a signal strength of the beacon signal, and a validity check of predetermined information in the beacon header sub-frame.

16. A method for determining a channel for communication in a wireless communication system, the method comprising:
receiving one or more sub-frames of a beacon signal on a beaconing channel until a legitimacy condition of the beacon signal on the beaconing channel is met, the beacon signal being transmitted by a beaconing device, wherein the legitimacy condition is based on determination of a cryptographic authentication check of the beacon signal, the cryptographic authentication check of the beacon signal comprises seeking a public key for verifying a beacon signature created by the beaconing device, the public key being attributed to the beaconing device, and the beacon signature being embedded in the beacon validation sub-frame;
determining a suitability of the channel for communication in the wireless communication system based on the legitimacy condition of the beacon signal;
retrieving the public key corresponding to the beaconing device from a database; and obtaining the public-key certificate from the beacon certificate sub-frame of the beacon signal on the beaconing channel.

17. The method of claim 16, wherein the cryptographic authentication check is based on a standard public-key signature verification technique, wherein the standard public-key signature verification technique comprises verifying the legitimacy of a public-key certificate extracted from the beacon certificate sub-frame.

18. The method of claim 16, wherein the obtaining step comprises listening to the beaconing channel to receive the beacon certificate sub-frame of the beacon signal, wherein the public key is embedded in the beacon certificate sub-frame.

19. The method of claim 16, further comprises:
classifying the channel in a suitable channel category when a cryptographic authentication check of the beacon signal indicates that the beacon signal is illegitimate; and
classifying the channel in an unsuitable channel category when a cryptographic authentication check of the beacon signal indicates that the beacon signal is legitimate, wherein one or more channels in the suitable channel category is used for communication in the wireless communication system.

20. A system for determining a channel for communication in a wireless communication system, the system comprising:
a receiving module, the receiving module receiving one or more sub-frames of a beacon signal on a beaconing channel until a legitimacy condition of the beacon signal is met, wherein the one or more sub-frames comprises at least one of an error-checking code and an error-correcting code, each error-checking code being used to check for one or more errors in at least one of the one or more sub-frames, the one or more sub-frames comprising a synchronization sub-frame, a beacon header sub-frame, a beacon validation sub-frame and a beacon certificate sub-frame, each error-correcting code being used for correcting one or more errors in an individual sub-frame, the individual sub-frame being one of a beacon header sub-frame, a beacon validation sub-frame or a beacon certificate sub-frame; and
a controlling module, the controlling module configured to:
detect a legitimacy condition of the beacon signal on the beaconing channel, wherein the legitimacy condition is based on determination of at least one of a priority indicated in the beacon signal, a signal strength of the beacon signal, a cryptographic authentication check of the beacon signal, and a validity check of predetermined information in the beacon header sub-frame;
notify the receiving module, if the legitimacy condition is met; and
determine a suitability of the channel for communication in the wireless communication system based on the legitimacy condition.

21. The system of claim 20, wherein the controlling module is further configured to classify the channel in one of a suitable channel category and an unsuitable channel category based on the legitimacy condition, wherein one or more channels in the suitable channel category is used for communication in the wireless communication system.

22. The system of claim 21, wherein the controlling module classifies the channel in the suitable channel category when at least one of a priority indicated in the beacon signal is below a predetermined level, the signal strength of the beacon signal is below a predetermined level, the cryptographic authentication check of the beacon signal indicates that the beacon signal is illegitimate, and the validity check of the predetermined information in the beacon header sub-frame indicates that the beacon signal is invalid.

23. The system of claim 21, wherein the controlling module classifies the channel in the unsuitable channel category when at least one of the priority indicated in the beacon signal is above a predetermined level, the signal strength of the beacon signal is above a predetermined level, the cryptographic authentication check of the beacon signal indicates that the beacon signal is legitimate, and the validity check of the predetermined information in the beacon header sub-frame indicates that the beacon signal is valid.

* * * * *